United States Patent [19]
Kimura

[11] Patent Number: 5,509,378
[45] Date of Patent: Apr. 23, 1996

[54] METHOD OF BRUSHING A PET USING A BRUSH WITH AN ADJUSTABLE HEAD

[75] Inventor: Yoshihide Kimura, Kasai, Japan

[73] Assignee: Araki Industry Co., Ltd., Kasai, Japan

[21] Appl. No.: 353,303

[22] Filed: Dec. 5, 1994

Related U.S. Application Data

[63] Continuation of Ser. No. 242,632, May 13, 1994, abandoned.

[30] Foreign Application Priority Data

May 26, 1993 [JP] Japan ................................. 5-033184

[51] Int. Cl.$^6$ ......................................................... A01K 13/00
[52] U.S. Cl. ........................... 119/94; 119/86; 15/144.1; 15/172; 15/186; 15/200
[58] Field of Search ......................... 15/142, 144.1, 15/160, 172, 186, 187, 200; 119/83, 86, 93, 94, 85, 87–92; 132/120, 150

[56] References Cited

U.S. PATENT DOCUMENTS

| | | | |
|---|---|---|---|
| 612,491 | 10/1898 | Eck | 15/144.1 |
| 727,035 | 5/1903 | Van Loan | 15/144.1 |
| 1,278,074 | 9/1918 | Phelps | 119/85 |
| 1,600,975 | 9/1926 | Calkins | 15/144.1 |
| 1,820,380 | 8/1931 | Dutton | 119/94 |
| 2,202,215 | 5/1940 | Lutz | 15/172 |
| 2,432,098 | 12/1947 | Horn | 15/144.1 |
| 3,045,271 | 7/1962 | Cinotti | 15/144.1 |
| 3,421,171 | 1/1969 | Tsuruzawa | 15/172 |
| 3,619,846 | 11/1971 | Krusche et al. | 15/172 |
| 3,766,590 | 10/1973 | Wachtel | 15/186 |
| 4,044,724 | 8/1977 | Merchill | 119/83 |
| 4,970,990 | 11/1990 | Wichelmi | 119/94 |
| 5,339,840 | 8/1994 | Koppel | 119/83 |
| 5,379,723 | 1/1995 | Branley | 119/83 |

FOREIGN PATENT DOCUMENTS

| | | | |
|---|---|---|---|
| 1381838 | 11/1964 | France | 15/144.1 |
| 548127 | 4/1932 | Germany | 15/144.1 |
| 79306 | 4/1918 | Switzerland | 15/186 |
| 262226 | 9/1949 | Switzerland | 15/200 |
| 322198 | 7/1957 | Switzerland | 15/172 |

*Primary Examiner*—Mark Spisich
*Attorney, Agent, or Firm*—Armstrong, Westerman, Hattori, McLeland & Naughton

[57] ABSTRACT

A brush for pets, such as dogs, cats, etc., according to the present invention may be used as a tool for trimming the hair of pets or used for the purpose of obtaining such effect as keeping cleanness of pets by cleaning dust or scurf or dandruff adhered on the hair or skin of pets, or as improving health of pets by massaging the skin of pets to facilitate circulation of blood or depilating to forcibly remove useless hairs or any parasites. The brush for pets is provided with an engaging mechanism 8 including a plurality of recesses 30F formed on an upper surface of an upper part 30 of a brush element holder, a coiled spring 9A previously inserted into a blind hole 43 of a connecting part 4, and a ball 9B always biased downwardly by the coiled spring 9A, so that brushing widths W1, W2 and W3 when the brush is pulled and moved in the direction of an axis 1C of a handle 1 gripped by user are set based on any engaging positions selected among engaging positions between the connecting part 4 and the brush element holder 3 through the engaging mechanism 8.

7 Claims, 13 Drawing Sheets

5,509,378

METHOD OF BRUSHING A PET USING A BRUSH WITH AN ADJUSTABLE HEAD

This application is a continuation of application Ser. No. 08/242,632 filed May 13, 1994, now abandoned.

BACKGROUND OF THE INVENTION

1. Field of the Invention

This invention relates to a brush for pets, and more particularly to a brush for pets wherein a brush element can be changed in widthwise size with respect to the direction of brushing correspondingly to specific parts of pets' bodies to be brushed, thereby effectively improving workability and efficiency of brushing.

2. Description of the Prior Art

Various brushes for pets, such as dogs, cats, etc., are hitherto known and used as a tool for trimming the hair of pets or used for the purpose of obtaining such effect as keeping cleanness of pets by cleaning dust or scurf (or dandruff) adhered on the hair or skin of pets, or as improving health of pets by massaging the skin of pets to facilitate circulation of blood or depilating to forcibly remove useless hairs or any parasites.

The conventional brushes for pets generally comprise, as shown in FIGS. 19 and 20, a handle 100 having at a remote end a brush element setting member 101 into which the brush element 102 including numerous hairs made of resin, animals' hairs, or thin metal wires is so set in the patterns of rectangular or elliptic shapes shown in FIGS. 19 and 20 that the brush element 102 is aligned at its longitudinal or major axis with an axis 100C of the handle 100 and the hairs of the brush element 102 extend downwardly from the brush element setting member 101. And, the handle 100 and the brush element setting member 101 integrally coupled therewith are not rotatable relative to each other. Hence, when the brush is moved for brushing in the same direction X as the handle's axis 100C, the widthwise size W1 of the brush element 102 is not changeable.

Meanwhile, in brushing pets, for example, a dog, there are seen some parts of its body such as the head, neck, trunk, and limbs where the brushing areas are larger and the brush may be moved relatively roughly without any parts or organs which are likely to be scratched by brushing and are to be refrained from being brushed, and other parts of the dog's body, where the brushing areas are smaller and a relatively careful movement of brush is required, such as those parts located near any organs, for example, eyes or mouth which are likely to be scratched by brushing, or any narrow parts, such as the armpit, crotch, the root of tail and openings of ears.

For the parts of the dog's body where the brushing areas are larger and the brush may be moved relatively roughly, the widthwise size of the brush element 102 when set to be larger with respect to the moving direction X of brush may achieve improvement of the performance and efficiency of brushing. For the other parts where the brushing areas are smaller and a relatively careful movement of brush is required, the widthwise size of the brush element 102 when set to be smaller with respect to the brush's moving direction may obtain improvement of the workability of brushing.

However, in the conventional brush for pets, the handle 100 and the brush element setting member 101 are integrally coupled in the manner of being not rotatable relative to each other. Hence, the widthwise size W1 of the brush element 102 is not changeable with respect to the moving direction X of the brush. In other words, the width W1 wherein brushing is possible with the brush being moved in the direction X is limited to the sizes smaller than the longitudinal size L1 of the brush element. Hence, the conventional brush is proper for brushing on the parts where the relatively careful movement of brush is required, but not for brushing on those where a relatively rough movement of brush is permitted.

FIG. 21 shows another conventional type of brush for pets wherein a brush element 102 is set into a brush element setting member 101 in the pattern of rectangular shape with the major axis size L1 extending perpendicularly to an axis 100C of a handle 100 and the hairs of the brush element 102 extending downwardly from the brush element setting member 101. And the handle 100 and the brush element setting member 101 integrally coupled therewith are not rotatable relative to each other. In use of the brush, the brushing width wherein brushing is possible with the brush being moved in the direction X is limited only to the major axis size L1 larger than the widthwise (minor axis) size W1 of the brush element. Hence, the conventional brush is proper for brushing on the parts where a relatively rough movement of brush is permitted, but not for brushing on those where the relatively careful movement of brush is required.

The brush shown in FIGS. 19 and 20 may be moved in the direction Y extending perpendicularly to the axis 100C of the handle 100, so that the longitudinal size L1 larger than the widthwise size W1 is used as the brushing width in brushing for the parts of pets bodies where a relatively rough movement of brush is permitted. Furthermore, the brush shown in FIG. 21 may be moved in the direction Y, so that the minor axis size W1 smaller than the major axis size L1 is used as the brushing width in brushing for the parts of pets bodies where a relatively careful movement of brush is required. However, the brushing method by moving the brush in the direction Y is inconvenient and poor in workability. Hence, there has been expected development of a brush for pets in which the brushing width may be suitably changed with respect to the brush moving direction X correspondingly to specific parts of pets to be brushed.

SUMMARY OF THE INVENTION

As seen from the above, the conventional brushes for pets do (or can) not change the brushing width with respect to the moving direction of brush moved in the same direction as of the axis of the handle, so that the workability and efficiency of brushing vary correspondingly to specific parts of pets' bodies to be brushed. Hence, the conventional brushes have the problem that they do not provide excellent workability and high efficiency of brushing for every part of pets' bodies to be brushed.

The present invention has been designed to overcome the above problem.

An object of the invention is to provide a brush for pets wherein the brushing width with respect to the moving direction of brush moved in the same direction as of the axis of the handle is changeable correspondingly to specific parts of pets' bodies to be brushed, thereby providing excellent workability and high efficiency of brushing.

To achieve the object, the brush for pets according to the present invention comprises:

a handle; and a brush element holder which holds the brush element made of numerous hairs or thin metal wires in such manner that the brush element extends downwardly from the brush element holder; characterized in that there are provided:

a connecting part provided at the utmost end of the handle;

a vertical connecting pin for connecting the connecting part with the brush element holder in such manner that the connecting part and the brush element holder are rotatable relative to each other around a vertical axis; and an engaging mechanism provided as divided between the connecting part and the brush element holder for allowing engagement and disengagement of the corresponding parts of the engaging mechanism at a plurality of engaging positions; whereby the connecting part and the brush element holder can be positioned by the engaging mechanism at any desired positions selected among the plurality of engaging positions through their relative rotation around the vertical axis.

According to the pets' brush constructed as above, the brushing width when the brush is pulled and moved in the direction of the longitudinal axis of the handle being gripped by user is set based on any engaging position selected, by the engaging mechanism, among the plurality of engaging positions between the connecting part and the brush element holder. The selected brushing width may be made larger or smaller stepwise by rotating the connecting part and the brush element holder relatively to each other at 90° around the vertical axis of the connecting pin in a normal or reverse rotating direction. The brushing width may be further made smaller or larger stepwise by rotating the connecting part and the brush element holder relatively to each other at 90° in a returning direction to the original position or in the normal or reverse rotating direction.

In detail, the handle is moved to allow the widthwise size of the brush element to function as the brushing width for brushing the parts of pets bodies where the relatively rough movement of the brush is permitted. Then, the connecting part and the brush element holder may be rotated relatively to each other at 45° around the vertical axis of the connecting pin in the normal or reverse rotating direction, and positioned at this position by means of the engaging mechanism. The handle is moved with a largest widthwise size of the brush element being allowed to function as the brushing width for brushing the parts of pets bodies where the relatively rough movement of the brush is permitted.

The connecting part and the brush element holder may be further rotated relatively to each other at 45° around the vertical axis of the connecting pin in the normal or reverse rotating direction, and positioned at this position by means of the engaging mechanism. The handle is then moved with a smallest widthwise size of the brush element being allowed to function as the brushing width for brushing the parts of pets bodies where the relatively careful movement of the brush is required. In this way, the invention provides that the brushing width when the brush is moved in the same direction as the axis of the handle is changeable corresponding to specific parts of pets bodies to be brushed, so that workability and efficiency of brushing can be improved for every part of pets bodies to be brushed.

DETAILED DESCRIPTION OF THE PREFERRED EMBODIMENT

Figure 1:
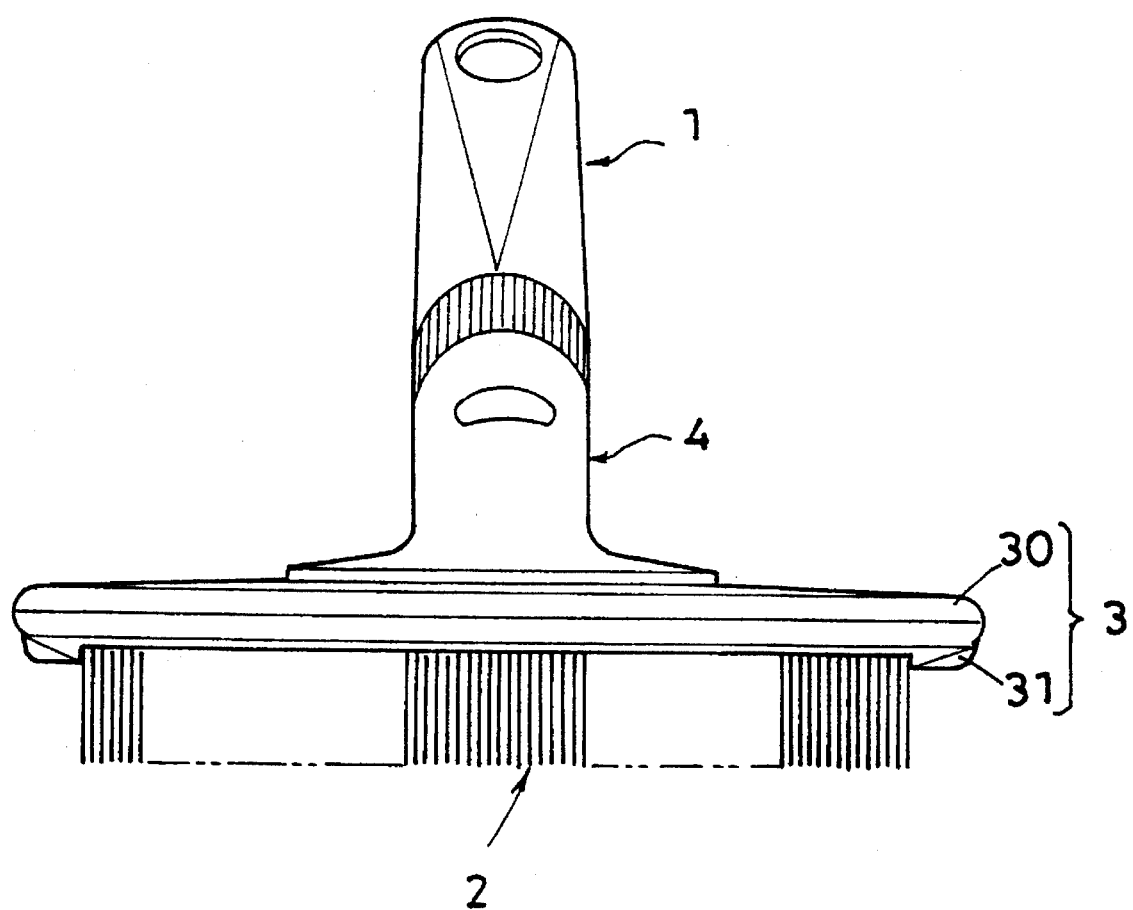
FIG. 1 is a front view showing an example of the present invention.
Figure 2:
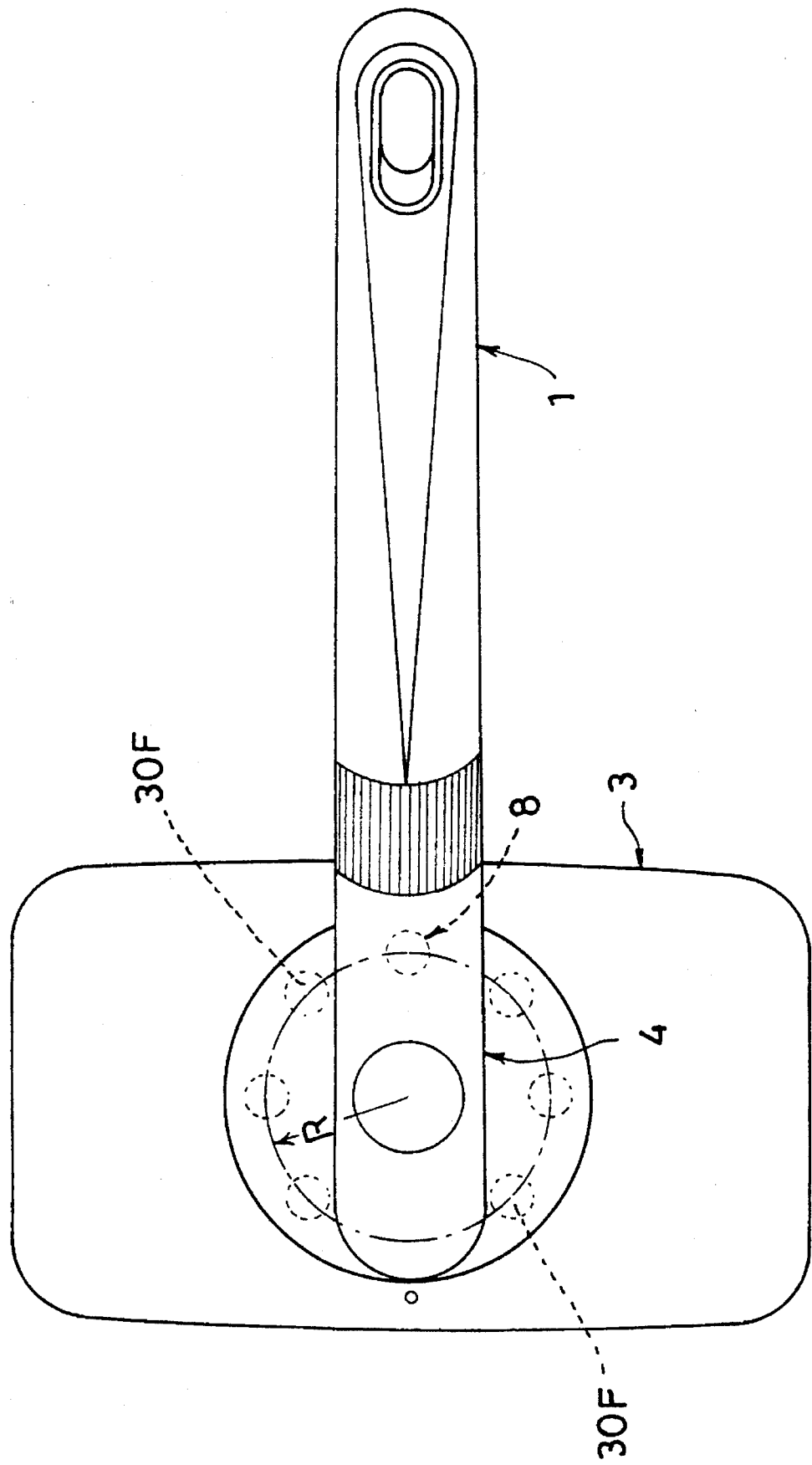
FIG. 2 is a plan view of the same.
Figure 3:
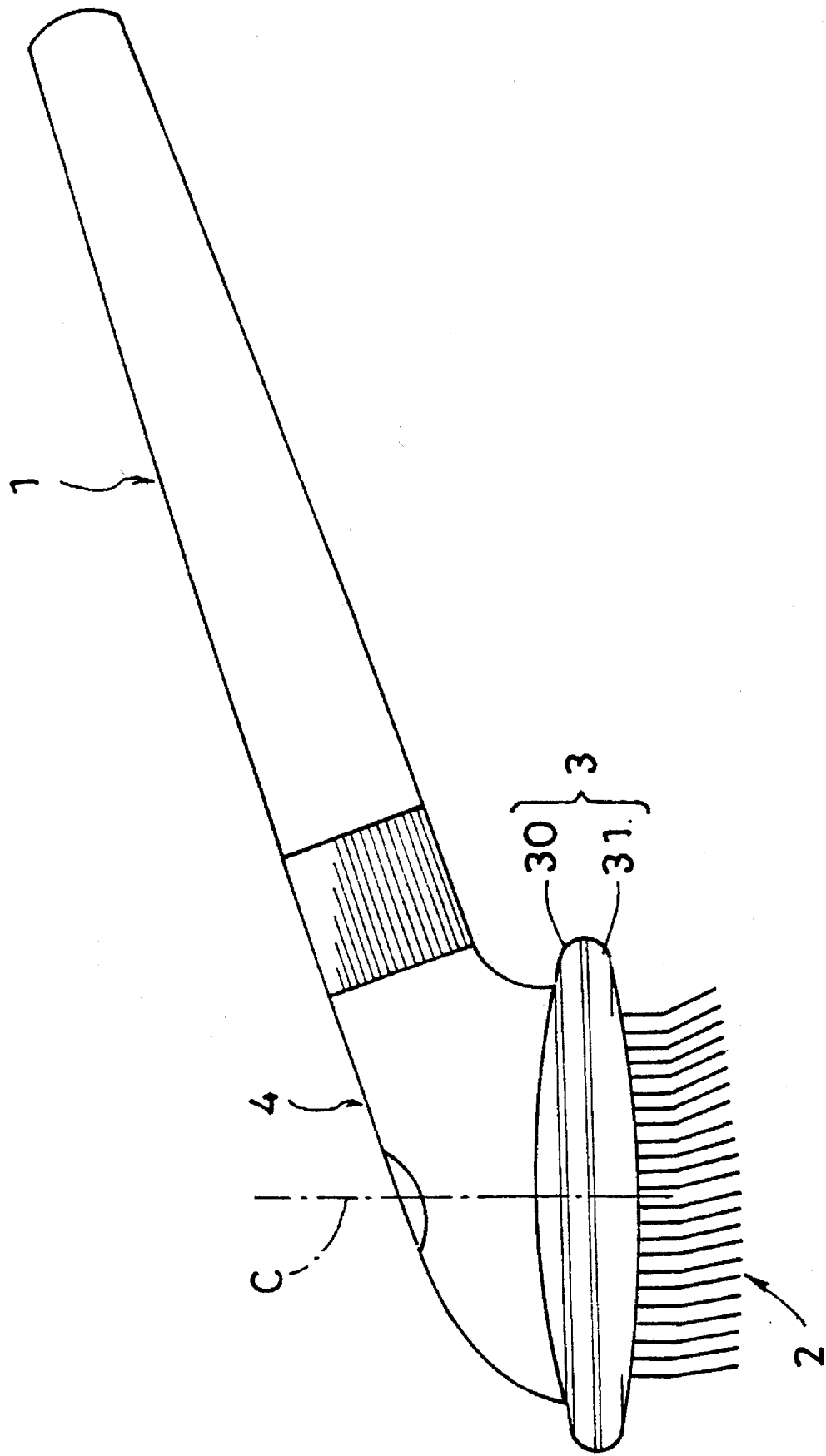
FIG. 3 is a left side view of the same.

The brush for pets shown in FIGS. 1, 2 and 3 comprises a handle 1 made of synthetic resin, a brush element 2 made of numerous thin metal wires, and a brush element holder 3 made of synthetic resin and holding the brush element 2 in a manner that the brush element 2 extends downwardly from the brush element holder 3. The handle 1 is provided at the utmost end with a connecting part 4 made of synthetic resin. The connecting part 4 and the brush element holder 3 are coupled by a vertical connecting pin described later in a manner of being rotatable relatively to each other around a vertical axis C. The handle 1 is hollow and connected at the utmost end integrally with the connecting part 4 and detachably therefrom.

The brush element 2 uses numerous thin metal wires each in a fallen sideways V-like shape and is set into in a pattern as having a longitudinal section in a rectangular shape. The brush element holder 3 also has a rectangular longitudinal section corresponding to the setting pattern of the brush element 2.

The brush element holder 3 comprises an upper part 30 and a lower part 31 which located under the upper part 30 and integrally connected therewith, for example, by high frequency welding.

Figure 4:
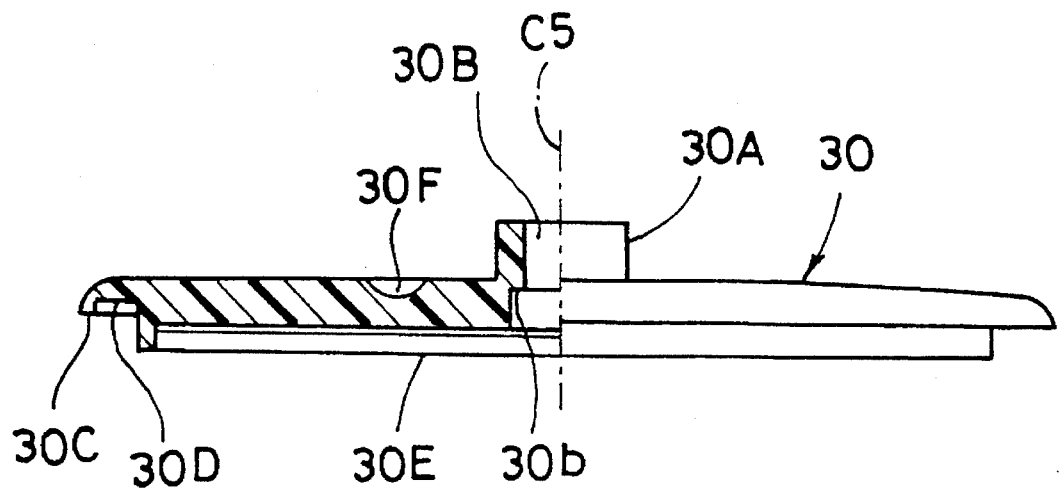
FIG. 4 is a partially sectional front elevational view showing a brush element holder with the left half of the upper part being sectioned.
Figure 5:
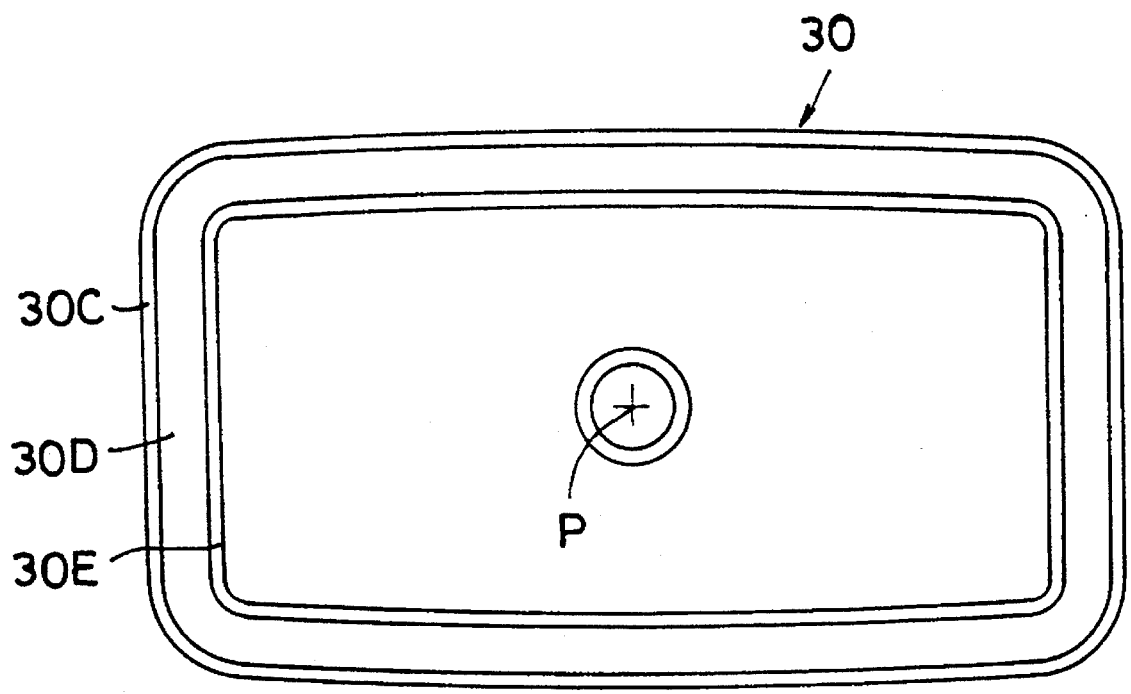
FIG. 5 is a bottom view of the brush element holder shown in FIG. 4.

The upper part 30 is, as shown in FIGS. 4 and 5, provided with an upwardly facing boss 30A having a central axis, i.e., a vertical axis C5 which extends vertically through the central point P. The boss 30A has a stepped through bore 30B coaxial therewith and having therein a step 30*b* facing downwardly. The upper part 30 is provided at the lower surface of the outer periphery with a first annular engaging surface 30C, inwardly of and above the first annular engaging surface 30C with a second annular engaging surface 30D, and further inwardly of the second annular engaging surface 30D with an annular pusher 30E. Additionally, eight recesses 30F (FIG. 2) are formed, being circularly equally spaced to one another, on the upper surface of the upper part 30 along a circle coaxial with the stepped through bore 30B.

Figure 6:
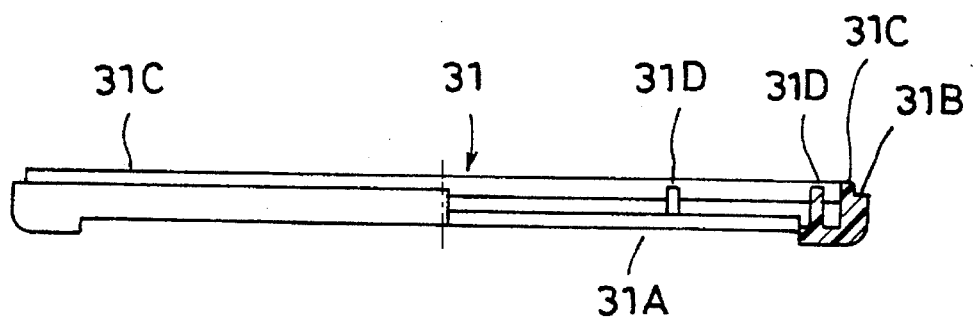
FIG. 6 is a partially sectional front elevational view showing a brush element holder with the right half of the lower part being sectioned.
Figure 7:
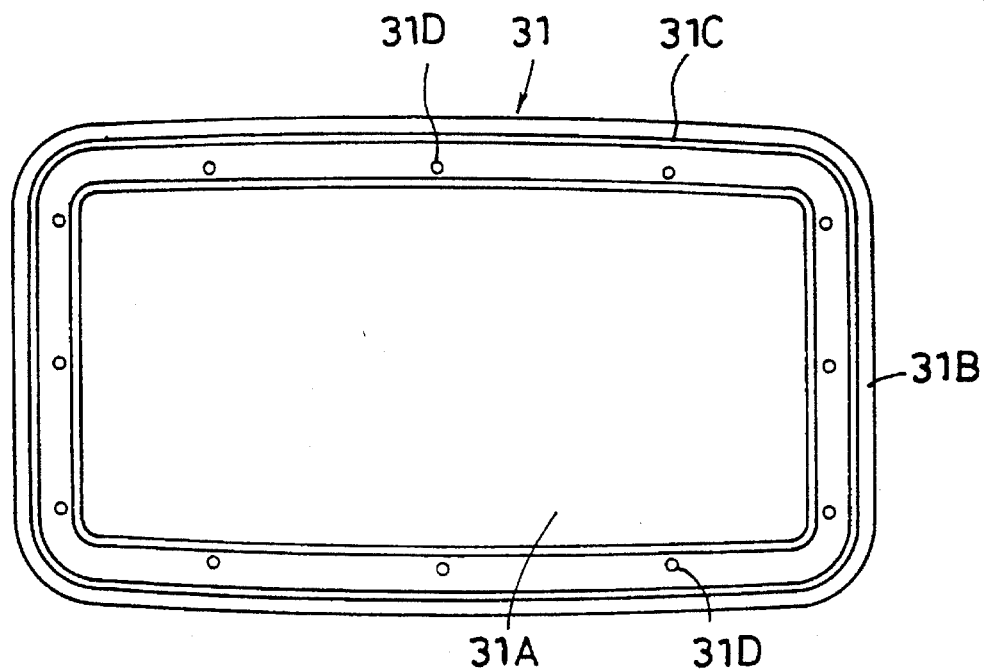
FIG. 7 is a bottom view of the brush element holder shown in FIG. 6.

The lower part 31 is, as shown in FIGS. 6 and 7, formed in the frame-like shape and has a rectangular opening 31A. The lower part 31 is provided at the upper surface of the outer periphery with a first annular engaging surface 31B (which abuts against the first annular engaging surface 30C), inwardly of and above the first annular engaging surface 31B with a second annular engaging surface 31C (which abuts against the second annular engaging surface 30D), and further inwardly of the second annular engaging surface 31C with a plurality of upwardly facing holding pins 31D.

Figure 8:
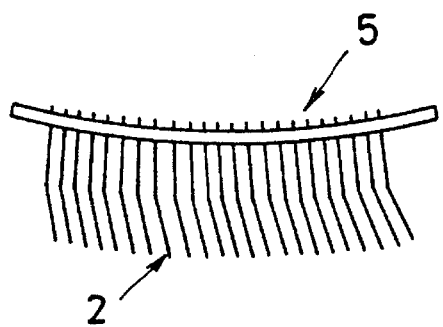
FIG. 8 is a left side view of a brush element setting cloth.
Figure 9:
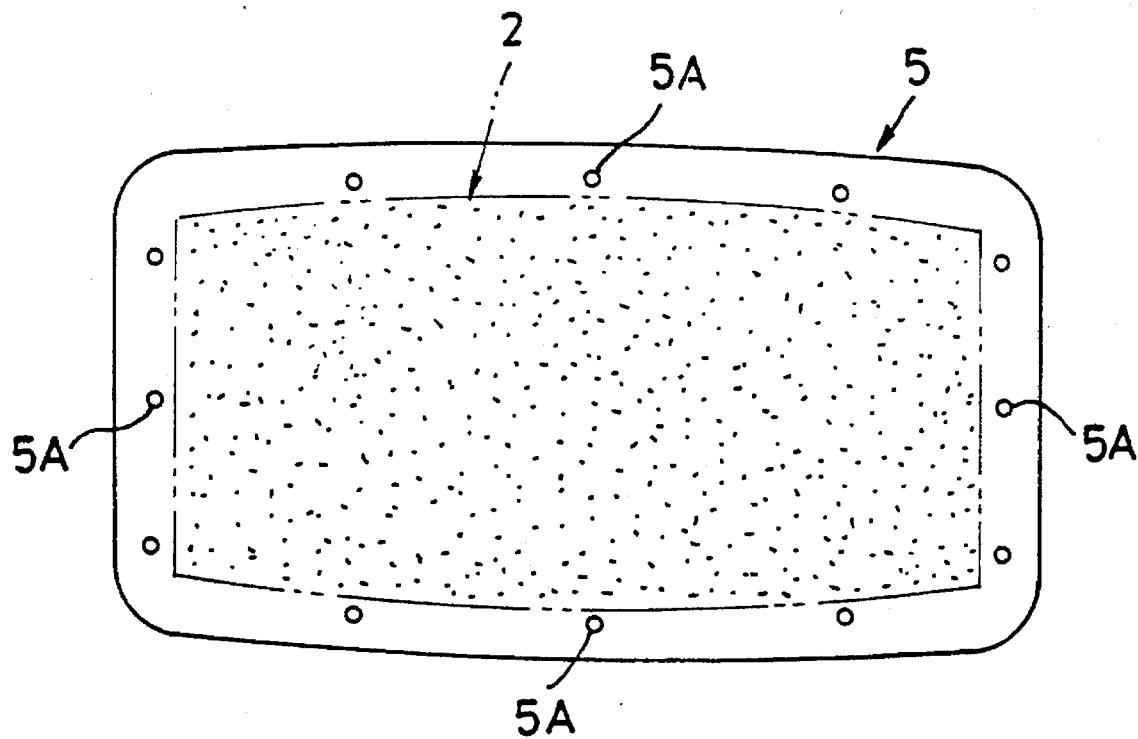
FIG. 9 is a longitudinally sectional side view of the lower part of the brush element holder by which the brush element setting cloth is supported in a manner of being hung down.
Figure 10:
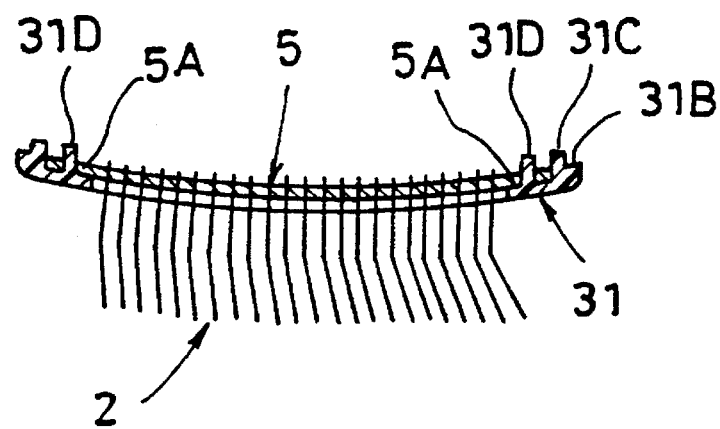
FIG. 10 is a longitudinally sectional elevational view of the lower part of the brush element holder by which the brush element setting cloth is supported in a manner of being hung down.

The brush element 2 made of numerous thin metal wires shown in FIGS. 1 and 3 is set into a brush element setting cloth 5 made of rubber in the manner that the brush element extends through the setting cloth 5 downwardly as shown in FIG. 8. The setting cloth 5 is formed to be larger in size than the opening 31A of the lower part 31 (FIG. 7) and slightly smaller in size than the inner periphery of the second annular engaging surface 31C, and has on the outer peripheral edge a plurality of small bores 5A into which the plurality of holding pins 31D (FIG. 7) are fit. Hence, as shown in FIG. 10, the holding pins 31D are fit into the small bores 5A from the upper side of the lower part 31, so that the brush element setting cloth 5 is held by the lower part 31 in a manner of being hung down.

Figure 11:
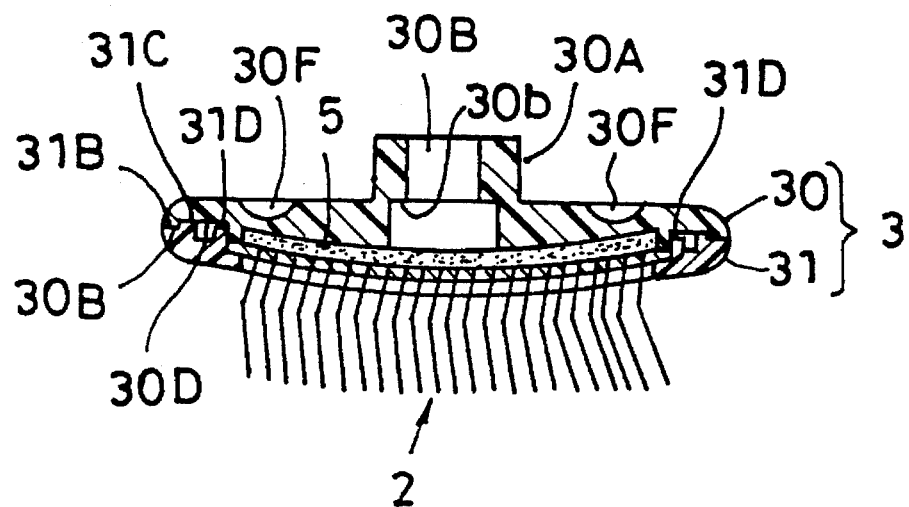
FIG. 11 is a longitudinally sectional side view of the coupled upper and lower parts of the brush element holder.

The lower part 31 holding and hanging down the brush element setting cloth 5 is, as shown in FIG. 11, abutted at the first annular engaging surface 31B against the first annular engaging surface 30C of the upper part 30 and at the second annular engaging surface 31C against the second annular engaging surface 30D, and welded by high frequency welding at the first engaging surfaces 31B and 30C and also at the second engaging surfaces 31C and 30D to integrally couple the upper and lower parts 30 and 31, forming the brush element holder 3.

Figure 12:
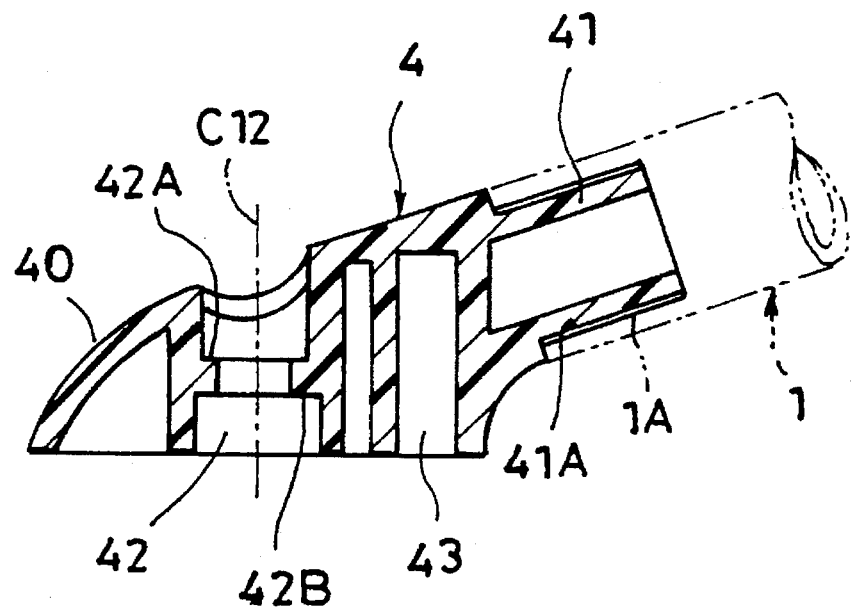
FIG. 12 is a longitudinally sectional side view of the connecting part.
Figure 13:
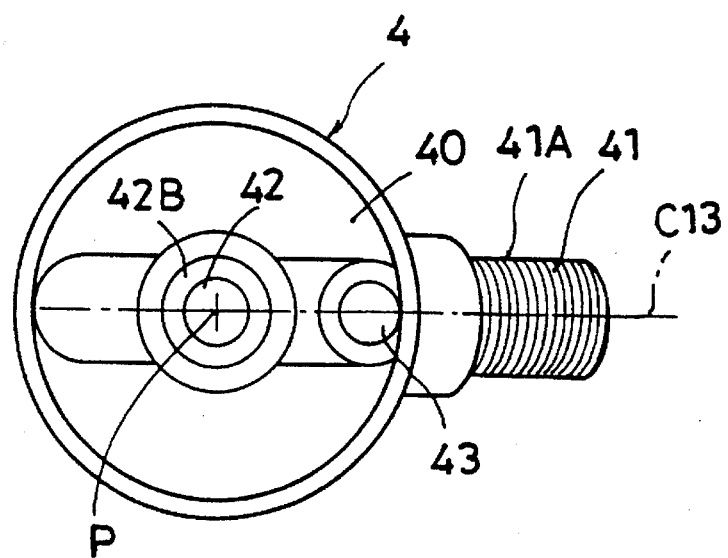
FIG. 13 is a bottom view of the connecting part shown in FIG. 12.

The connecting part 4 is, as shown in FIGS. 12 and 13, provided with a swollen portion 40 having a circular bottom surface and a connecting tubular portion 41 extending slantwise upwardly along a longitudinal axis C13 which extends through the center P of the circular bottom surface. The connecting tubular portion 41 has on the outer periphery an external thread 41A with which an internal thread 1A provided at the utmost end of the handle 1 is screwed, so that the connecting part 4 can be integrally coupled with the utmost end of the handle 1 in a manner of detachably therefrom.

The connecting part 40 is provided at the swollen portion 40 with a stepped through bore 42 which has therein stepped portions and a central axis, i.e., a vertical axis C12 extending vertically through the centeral point P. The stepped through bore 42 has on the upper part of the inner periphery an upwardly facing stepped portion 42A and on the lower part a downwardly facing stepped portion 42B. Between the stepped through bore 42 and the connecting tubular portion 41 is provided a blind hole 43 which opens at the circular bottom surface and extends vertically. The interval between the central point P and the center of the blind hole 43 is set to be equal to the radius R of the circle coaxial with the stepped through bore 30B shown in FIG. 2 along which the eight recesses 30F are formed.

Figure 15:
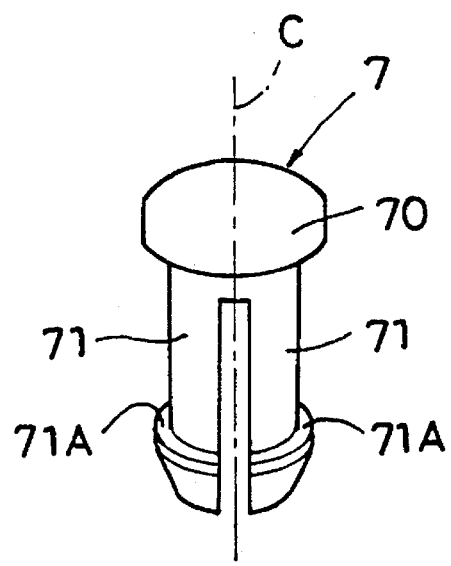
FIG. 15 is a perspective view showing an example of the connecting pin.
Figure 14:
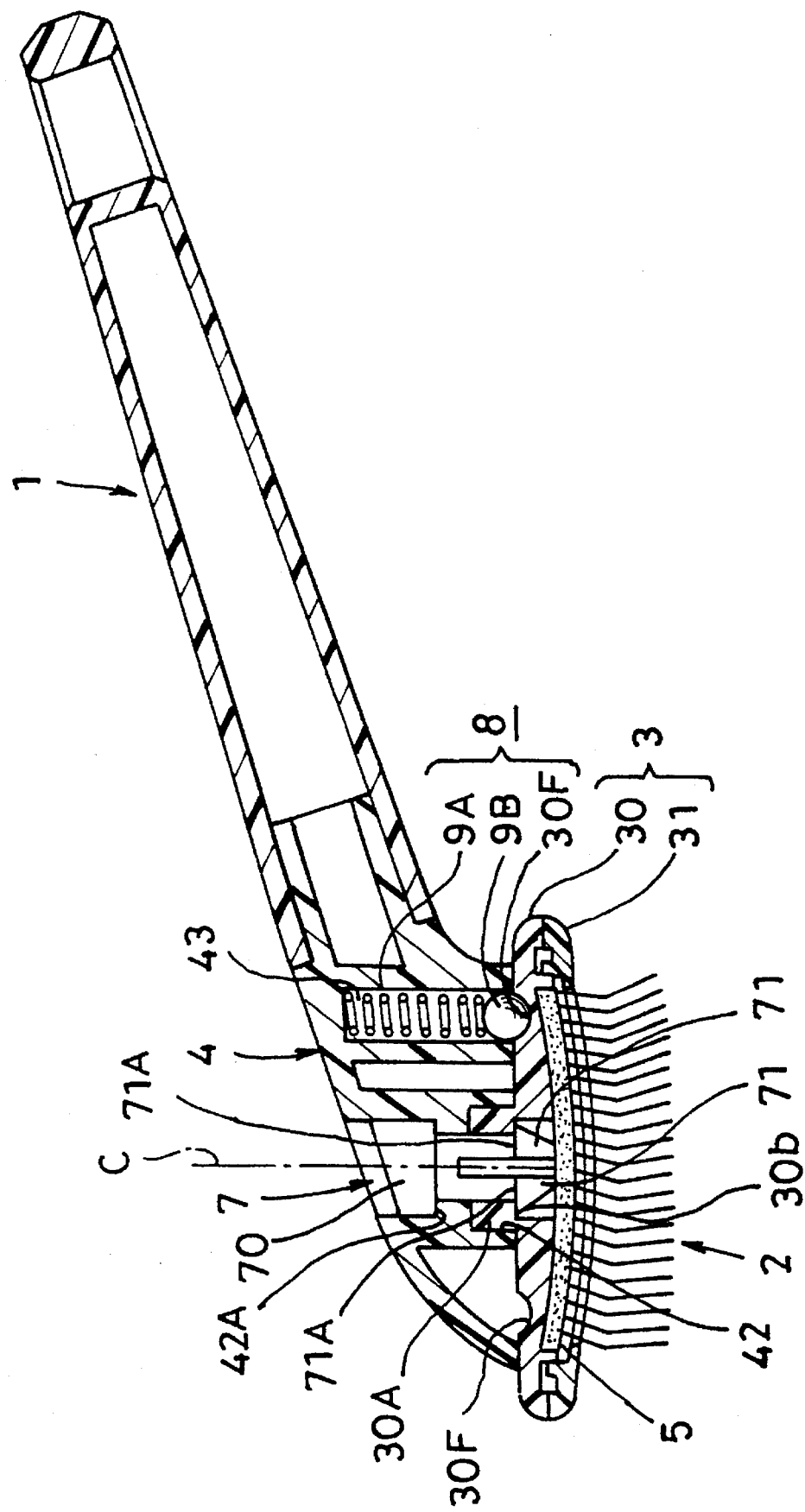
FIG. 14 is a longitudinally sectional side view of the brush assembled.

As shown in FIG. 14, the connecting part 4 and the brush element holder 3 are coupled by the vertical connecting pin 7 in the manner of being rotatable relatively to each other around the vertical axis C. In detail, the connecting pin 7 is made of synthetic resin and in a rivet-like shape, as shown in FIG. 15, and comprises a head 70, legs 71 in a fork-like shape diverging vertically, and retaining steps 71A which project radially outwardly of the outer peripheral lower parts of the legs 71 and face upwardly.

Hence, as seen in FIG. 14, the boss 30A on the brush element holder 3 is inserted into the stepped through bore 42 of the connecting part 4 from the lower side to abut the upper surface of the boss 30A against the downwardly facing stepped portion 42B (FIG. 12). The connecting pin 7 is inserted from the upper side of the stepped through bore 42 into the same and the stepped through bore 30B (FIG. 4) to abut the lower surface of the head 70 against the upwardly facing stepped portion 42A of the through bore 42 and engage the upwardly facing retaining steps 71A on the fork-like legs 71 with the downwardly facing stepped portion 30*b* in the through bore 30B, thereby assembling the connecting part 4 and the brush element holder 3 into the state that they are coupled by the connecting pin 7 in the manner of being rotatable relatively to each other around the vertical axis C.

An engaging mechanism 8 is constituted by coupling the connecting part 4 and the brush element holder 3 through the connecting pin 7 in the manner that the members 3 and 4 are rotatable relatively to each other around the vertical axis C. The engaging mechanism 8 comprises the eight recesses 30F formed on the upper surface of the upper part 30, a coiled spring 9A which is previously inserted into the blind hole 43 before the connecting part 4 and the brush element holder 3 are coupled relatively rotatably to each other, and a ball 9B which always biased downwardly by the coiled spring 9A.

According to the above construction of the engaging mechanism, the brushing width when the brush is pulled and moved in the same direction X as the longitudinal axis 1C of the handle 1 (FIG. 16) being gripped by user is set based on any engaging position selected among the engaging positions between the connecting part 4 and the brush element holder 3 and positioned by the engaging mechanism 8. And the brushing width as set may be made larger or smaller stepwise by rotating the connecting part 4 and the brush element holder 3 relatively to each other at 90° around the vertical axis C of the connecting pin 7 (FIG. 14) in the normal or reverse rotating direction. The brushing width may be further made smaller or larger stepwise by rotating the connecting part 4 and the brush element holder 3 relatively to each other at 90° in a returning direction to the original position or further in the normal or reverse rotating direction.

Figure 17:
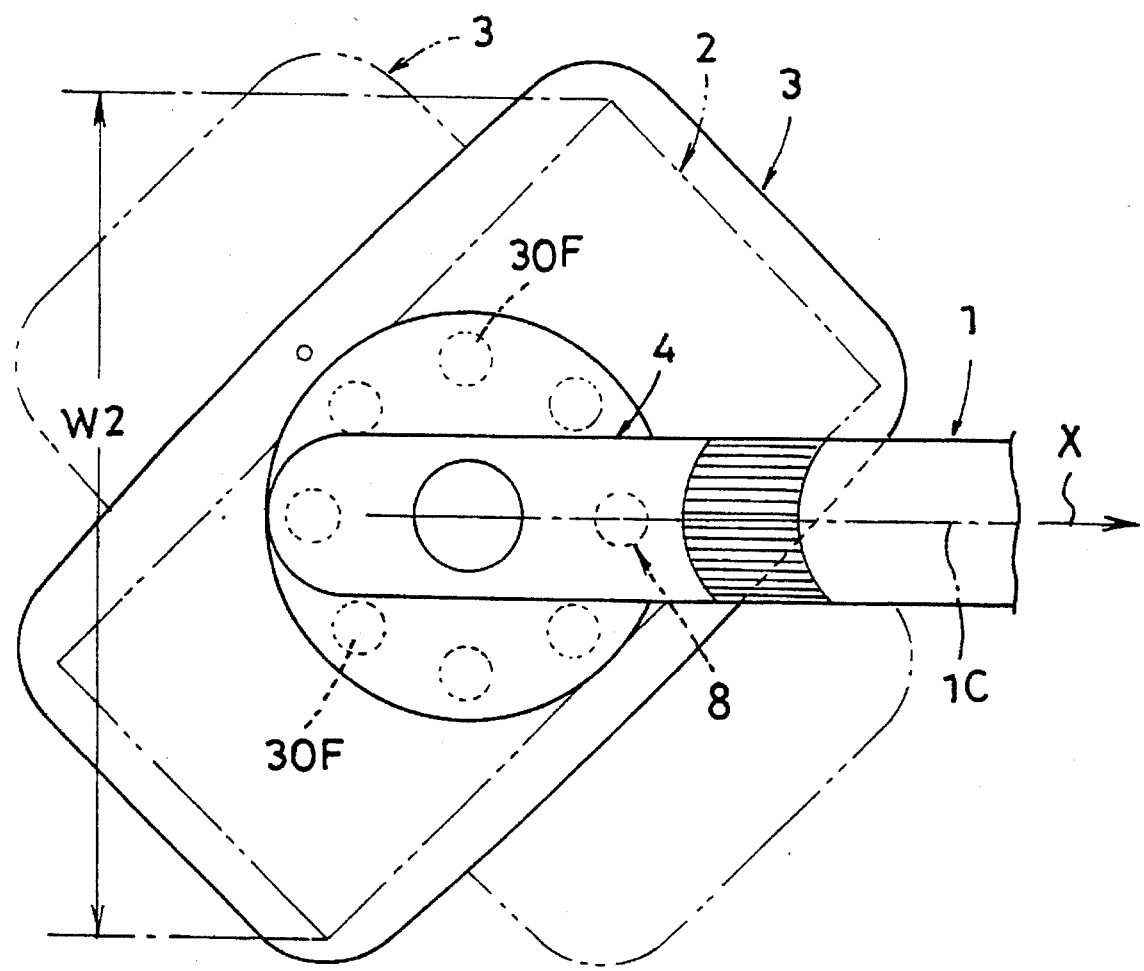
FIG. 17 is a plan view showing the change of the brushing width of the brush element.

In detail, the handle 1 is moved in the direction X to allow the widthwise size W1 of the brush element 2 to function as the brushing width for brushing the parts of pets bodies where the relatively rough movement of the brush is permitted. Then, the connecting part 4 and the brush element holder 3 may be rotated relatively to each other at 45° around the vertical axis C of the connecting pin 7 in the normal or reverse rotating direction, and positioned at this position by means of the engaging mechanism 8 as shown in FIG. 17. The handle 1 is then moved with a largest widthwise size W2 of the brush element 2 being allowed to function as the brushing width for brushing the parts of pets bodies where the relatively rough movement of the brush is permitted.

Figure 16:
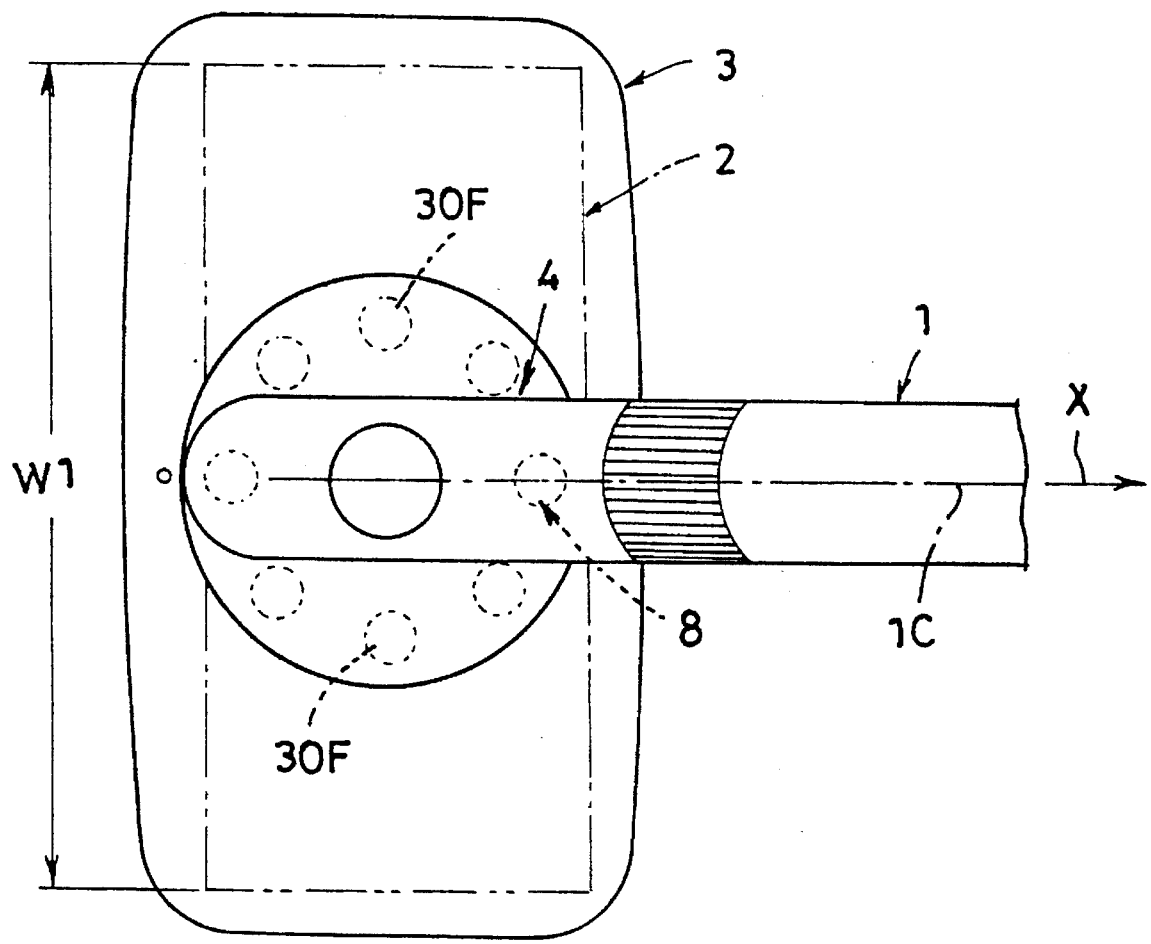
FIG. 16 is a plan view showing the change of the brushing width of the brush element.

When the connecting part 4 and the brush element holder 3 are rotated relatively to each other from the state shown in FIG. 16 to that in FIG. 17, the ball 9B is first pushed up against a biasing force of the coiled spring 9A and disengaged from the recess 30F shown in FIG. 16. When a next recess 30F comes below the ball 9B, the ball 9B is brought into engagement with the recess 30F by the biasing force of the coiled spring 9A, thereby providing the positioning in the state shown in FIG. 17.

Figure 18:
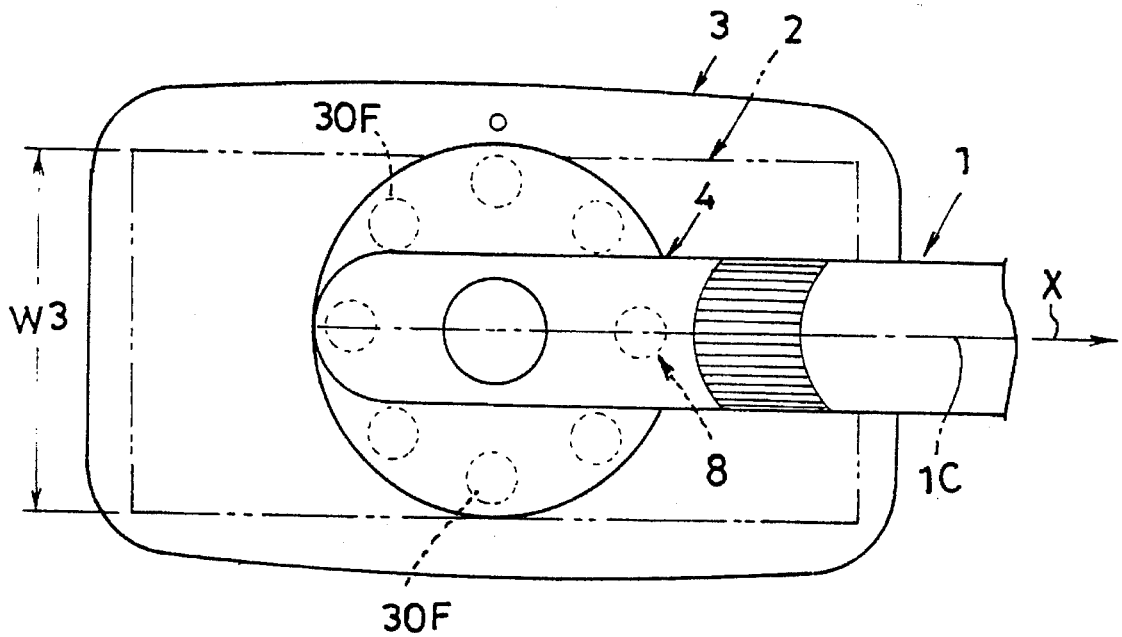
FIG. 18 is a plan view showing the change of the brushing width of the brush element.
Figure 19:
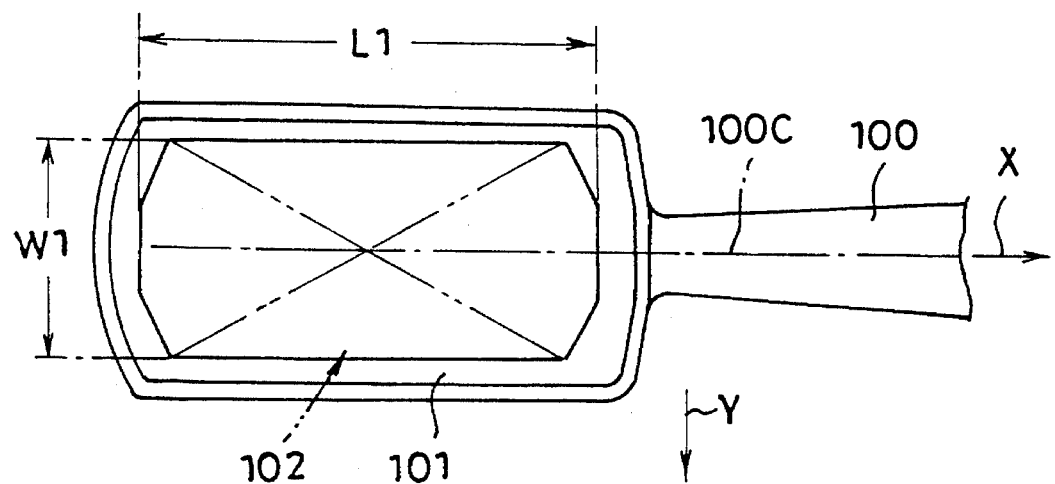
FIG. 19 is a bottom view showing a conventional art.
Figure 20:
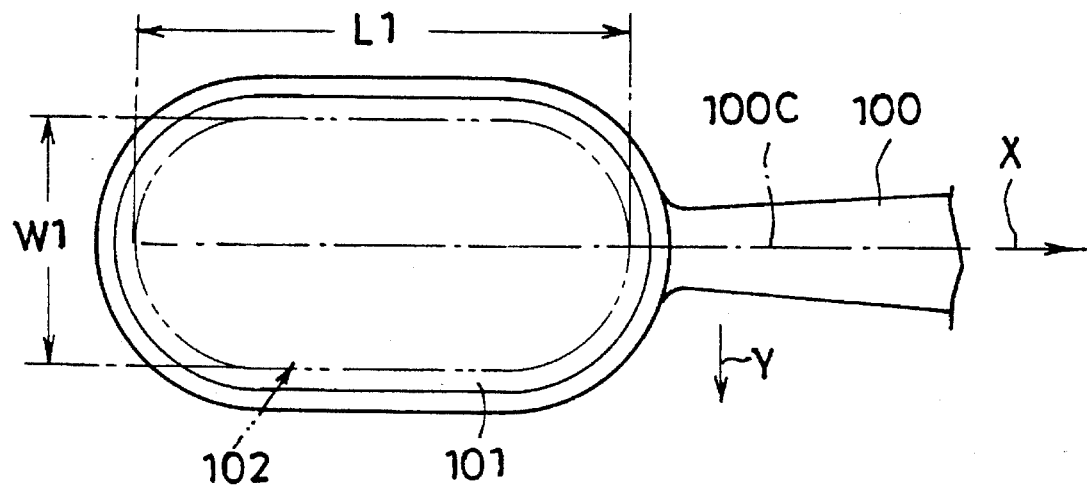
FIG. 20 is a bottom view showing other conventional art.
Figure 21:
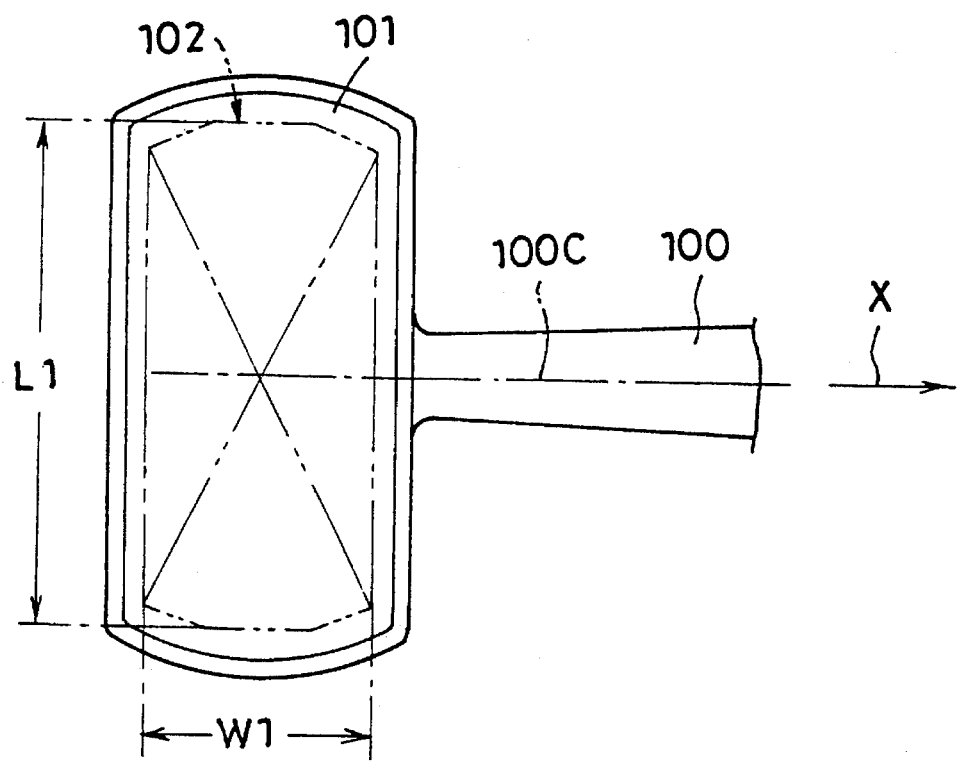
FIG. 21 is a bottom view showing another conventional art.

The connecting part 4 and the brush element holder 3 in the state in FIG. 17 may be further rotated relatively to each other at 45° around the vertical axis C of the connecting pin 7 in the normal or reverse rotating direction into the state in FIG. 18, and positioned at this position by means of the engaging mechanism 8. The handle 1 is then moved in the direction X with a smallest widthwise size W3 of the brush element 2 being allowed to function as the brushing width for brushing the parts of pets bodies where the relatively careful movement of the brush is required. In this way, the invention provides that the brushing width when the brush is moved in the same direction X as the axis 1C of the handle 1 is changeable corresponding to specific parts of pets bodies to be brushed, so that workability and efficiency of brushing can be improved for every part of pets bodies to be brushed.

In FIG. 16, when the handle 1 is moved in the same direction X as the axis 1C, the bending direction of hairs of the brush element 2 is aligned with the brush's moving direction X, thereby obtaining highest effects of brushing off any objects adhered on the pets skin and massaging the pets. When the connecting part 4 and the brush element holder 3 in the above state are rotated relatively to each other at 180° in the normal or reverse rotating direction, the bending direction of the hairs is reverse to the brush's moving direction X, the above brushing-off and massaging effects become smallest. In other words, the brushing-off and massaging effects gradually become smaller from the state having the highest effects (FIG. 16) to a state wherein the connecting part 4 and brush element holder 3 are relatively rotated at 180° in the normal or reverse rotating direction (not shown). However, the brush tends to be less caught by the hair of pets proportionally to reduction of the brushing-off and massaging effects, so that the brush may be suitably used for brushing in a season when the hair of pets increases or for brushing any kinds of pets which have larger number of hairs than the others.

The example referred to above is related to a brush for pets wherein the brush element 2 is made of numerous thin metal wires each bent in the falled sideways V-liked shape.

Shapes and materials for the brush element 2 are not limited to those referred to in the example and may employ numerous straight thin metal wires, hairs made of synthetic resin, or animal's hairs.

What is claimed is:

1. A method of brushing a pet having hair, comprising the steps of:
   (1) providing a brush for pets, comprising:
      a handle;
      a brush element including numerous bristles extending downwardly therefrom;
      a brush element holder which holds the brush element;
      a connecting part provided at a lower end of the handle;
      a vertical connecting pin for connecting the connecting part with the brush element holder such that the connecting part and the brush element holder are rotatable relative to each other around a vertical axis; and
      an engaging mechanism provided between the connecting part and the brush element holder for allowing engagement and disengagement of the engaging mechanism at a plurality of engaging positions, said engaging mechanism including a plurality of recesses formed on an upper surface of an upper part of the brush element holder, a coil spring inserted into a blind hole of the connecting part, and a ball which is always biased downwardly by the coiled spring and engageable with any selected one among the plurality of recesses;
   (2) positioning the connecting part and the brush element holder at a desired position via the engaging mechanism by rotating the connecting part relative to the brush element holder around the vertical axis such that the ball engages one of the recesses;
   (3) placing the bristles into contact with the hair of the pet and brushing the hair of the pet with the brush.

2. A method of brushing a pet as set forth in claim 1, wherein the step of providing includes providing the handle, the connecting part and the brush element holder from a synthetic resin.

3. A method of brushing a pet as set forth in claim 1, wherein the step of providing includes providing the bristles from numerous thin metal wires each bent in a V-like shape.

4. A method of brushing a pet as set forth in claim 1, wherein the step of providing includes providing the bristles from numerous straight thin metal wires.

5. A method of brushing a pet as set forth in claim 1, wherein the step of providing includes providing the bristles from numerous synthetic resin hairs.

6. A method of brushing a pet as set forth in claim 1, wherein said step of providing includes providing the bristles from numerous animal hairs.

7. A method of brushing a pet set forth in claim 1, wherein said step of providing includes providing eight recesses which are formed, being generally circularly and equally spaced to one another, on the upper surface of the upper part of the brush element holder.

\* \* \* \* \*